United States Patent [19]

Klaus

[11] Patent Number: 4,511,180
[45] Date of Patent: Apr. 16, 1985

[54] HEADREST IN PASSENGER CARS

[75] Inventor: Gersmann Klaus, Munich, Fed. Rep. of Germany

[73] Assignee: Bayerische Motoren Werke AG, Fed. Rep. of Germany

[21] Appl. No.: 426,929

[22] Filed: Sep. 29, 1982

[30] Foreign Application Priority Data

Sep. 30, 1981 [DE] Fed. Rep. of Germany ....... 3138851

[51] Int. Cl.³ .............................................. A47C 1/10
[52] U.S. Cl. .................................... 297/408; 297/391; 297/404
[58] Field of Search ............... 297/408, 403, 216, 391, 297/404

[56] References Cited

U.S. PATENT DOCUMENTS

| 2,973,029 | 2/1961 | Schlostein | 297/404 |
| 3,170,725 | 2/1965 | Komorowski | 297/403 X |
| 3,174,799 | 3/1965 | Haltenberger | 297/403 |
| 3,186,763 | 6/1965 | Ferrara | 297/403 |
| 4,322,111 | 3/1982 | Barley | 297/408 |
| 4,423,905 | 1/1984 | Ray | 297/216 X |

FOREIGN PATENT DOCUMENTS 2152202 10/1971 Fed. Rep. of Germany .

Primary Examiner—James T. McCall
Attorney, Agent, or Firm—Craig and Burns

[57] ABSTRACT

A headrest in passenger cars which is pivotable from its foremost position, required for performing its safety function, into at least one rearward position, from which latter position the headrest can be pivoted automatically back into the foremost position under the force of inertia acting on the headrest in case of strong deceleration of the automotive vehicle and can be locked into such foremost position, so that the headrest, even if pivoted into the rearward position to enhance the occupant's comfort, is, in case of necessity, automatically ready in the foremost position to fulfill its safety function. In connection with a headrest at the rear vehicle seat, such headrest can additionally or alternatively be pivoted onto the hat shelf underneath the rear window of the vehicle so that, when the rear vehicle seat is unoccupied, the driver's unobstructed field of vision via the inside rearview mirror toward the rear is not impaired.

4 Claims, 4 Drawing Figures

HEADREST IN PASSENGER CARS

The invention relates to a headrest in passenger cars with a mounting bracket carrying the headrest padding, this mounting bracket being attached to the vehicle body in the zone of the backrest of a vehicle seat, or to the backrest.

The safety function of headrests on the forward and rearward seats of passenger cars resides, in cooperation with the safety belt, in catching and supporting the occupant's head after a strong deceleration of the automotive vehicle as early as possible and thereby preventing an excessive flexion of the occupant's head toward the rear, a condition which can lead to a broken neck. From this safety function evolves the requirement to arrange the headrest padding of the headrest as far forwardly as possible relative to the backrest of the seat. Such a position of the headrest padding, however, can be an impairment of the occupant's comfort during normal driving conditions because it can prevent the occupant from assuming the seating position most convenient for him, for example leaning his back against the backrest of the seat without having to angle his head toward the front with respect to his back.

Although adjustment possibilities exist in the conventional headrests, these are limited to a vertical adjustability of the headrest padding to adapt its level to the body size of the occupant, and to a rotatability of the headrest padding with respect to its mounting bracket to adapt the contour of the forwardly located part of the headrest padding to the shape of the occupant's back of the neck.

The invention solves the problem of constructing a headrest of the type mentioned hereinabove in such a way that it can be adjusted, without impairment of its safety function, in the longitudinal direction of the vehicle with respect to the backrest of the vehicle seat.

This is attained according to this invention by designing the mounting bracket as a pivoting bracket mounted to be pivotable about a horizontal pivot axis extending at right angles to the longitudinal vehicle axis, from a foremost position determined by a stop into at least one rearward position wherein the center of gravity of the headrest mass is located at a position spaced above the pivot axis of the mounting bracket, and from which position the mounting bracket is automatically pivotable forwardly into the foremost position under an inertial force acting on the headrest above a predetermined minimum deceleration of the automotive vehicle. In this foremost position, the mounting bracket can be locked in place against rearward pivoting by means of a spring-loaded detent device, which latter can be released by means of an actuating device for the release of the mounting bracket.

Therefore, when the mounting bracket, during normal driving conditions of the vehicle, is in the rearward position, and the vehicle, and thus the headrest, are strongly decelerated, during braking or in case of a collision, so that the upper part of occupant's body is first urged forwardly into the safety belt and thus the occupant's head is likewise displaced forwardly and, if in leaning contact with the headrest padding, may be lifted off from the latter, the invention provides that the headrest padding, under the force of inertia acting on the headrest, is automatically moved into the foremost pivoting position of the mounting bracket of the headrest padding determined by the stop, and is locked in position. Thereby the head, when flung back again after the deceleration, is caught by the headrest padding in a position which is most advantageous for the indicated safety reasons. The full safety function of the headrest thus is ensured by this invention even if the headrest padding, to enhance the occupant's comfort and the convenience offered during normal driving conditions of the automobile, is in a position deviating from the position optimum for fulfilling the safety task.

The invention is suitable for use in headrests of both front and rear vehicle seats. For the aforementioned safety reasons, headrests are also of advantage for the safety-belt-equipped rear vehicle seats of a passenger car. Therefore, the headrests at the rearward vehicle seat should, at least if occupied, be in a position relative to the backrest of the vehicle seat required to fulfill their safety function. However, such an arrangement may restrict the driver's vision toward the rear via the rearview mirror when the rear seat is unoccupied. The invention, though, is also capable of solving this problem, in that the mounting bracket of the headrest is pivotable from the foremost position of the headrest padding into a rearmost position toward the rear, wherein the headrest padding lies essentially horizontally.

Thereby the headrest padding, when the rear vehicle seat is unoccupied, can be swung, after release of the detent device, from the foremost pivoted position into the rearmost pivoted position, wherein the headrest padding is pivoted out of the angle of vision of the driver looking into the inside rearview mirror.

Although it is also possible in this embodiment of the invention to select the position of the center of gravity of the headrest mass with respect to the pivot axis of the bracket in its rearmost position, in such a way that the headrest padding is pivoted forwardly into the foremost pivoting position of the mounting bracket from its rearmost position automatically, above a predetermined minimum deceleration of the vehicle, this embodiment of the invention is not limited thereto. It may be more advantageous in this embodiment of the invention to refrain from providing an automatic pivoting of the mounting bracket from its rearmost pivoting position wherein the headrest padding is folded down, for example, onto the hat shelf under the rear window of the automotive vehicle, in case of a deceleration of the vehicle. This is to prevent the headrest padding, in an unfavorable case, from hitting with a relatively forcible impact the back of the neck and the head of a rear seat occupant, if the latter forgot to raise the headrest after entering the car.

Furthermore, this embodiment of the invention is not restricted to the feature of providing at least one additional, rearward intermedite position for the mounting bracket, although this is presently preferred. Such intermediate position lies between the foremost position of the mounting bracket and the position wherein the headrest padding is folded down on the hat shelf of the vehicle, for example.

If the mounting bracket can be adjustable from the foremost position into only one rearward pivoting position, then this latter position can likewise be determined by a stop without locking the bracket additionally in place in the rearward position by means of the detent device. However, preferably the detent device has several detent projections cooperating with the mounting bracket for locking the latter in several differing pivoting positions, so that the mounting bracket and thus the headrest padding can be locked, by means of the detent device, in addition to being locked in the foremost pivoting position, also in several rearward positions. As in the foremost pivoting position of the mounting bracket, the detent projections constitute also in these rearward pivoting positions of the bracket respectively rearward stops for the mounting bracket. They can be in the form of the forward flanks of corresponding detent teeth wherein the rearward flank of the respectively subsequent detent tooth in the forward direction extends in parallel to the pivoting plane of the bracket. Accordingly, the latter is supported in its rear pivoting positions on the detent teeth only from the rear. However, it is also possible to orient this rearward flank of the respectively next-forward detent tooth at a small angle with respect to the pivoting plane of the mounting bracket, so that the mounting bracket is held at this rear flank under the force of the restoring spring of the detent device also from the front in the respective, rear pivoting position. In this case, the restoring spring is adjusted to such a spring force that the automatic pivoting of the headrest into its foremost position still takes place, in adaptation to the mass of the headrest and the position of the mass center of gravity thereof, relative to the pivoting axis of the mounting bracket, above a predetermined minimum deceleration of the automotive vehicle.

Preferably, a spring engages the bracket, which spring cooperates with the bracket for pivoting of the latter toward the rear. This spring is also designed so that it does not prevent automatic pivoting of the headrest from one of its rear positions into the foremost position under strong deceleration of the automotive vehicle. Such a spring cooperating with the bracket for the rearward pivoting of the latter has the advantage that thereby, for pivoting the headrest toward the rear, the detent device need merely be released by the actuating means, and then the headrest will by itself pivot rearwardly under the force of the spring, without additional manipulation. Furthermore, this spring provides for a rattle-free support for the headrest in any of its pivoting positions, especially in the version according to this invention wherein the headrests at the rear vehicle seats can be swung away into a rearmost position wherein the headrest padding lies behind the backrest essentially horizontally, for example in an indentation on the hat shelf under the rear window of the vehicle.

The mounting bracket preferably has a U-shape, the headrest padding being attached to the bracket legs and the pivot axis of the bracket being constituted by its horizontally extending bracket base. Two angle levers are arranged at a spacing above the bracket base, these levers being swingable about vertical pivot axes and being located in mirror-image relationship to each other in a common horizontal plane between the bracket legs. The levers exhibit along the outer rim of one of their lever arms, extending at least approximately in parallel to the vertical pivoting plane of the bracket, detent stops which cooperate with the bracket. With their other lever arm, extending at right angles to the pivoting plane of the bracket, the levers engage on actuating slide common to both of them and displaceable in parallel to the pivoting plane of the bracket against the force of a restoring spring in the rearward direction.

It can be readily seen that other designs of the detent device are also suitable, for example, directional locking mechanisms by means of which the mounting bracket is released for pivoting thereof in the direction toward the front for raising the headrest upright, and is blocked for the other pivoting direction by means of the directional locking mechanism. In a preferred embodiment, the detent means is constructed as a directional ratchet means made up of a blocking member and a pressure pawl engaging this member under the bias of a retaining spring; this pressure pawl can be disengaged from the blocking member by means of the actuating device.

In this arrangement, the pressure pawl can be supported against the mounting bracket and can cooperate with a blocking member supported against the backrest of the vehicle seat and/or against the vehicle body, this blocking member carrying the directional ratchet teeth. However, preferably, in a reversed arrangement, the blocking member is in firm contact with the mounting bracket in the form of a ratchet wheel segment aligned perpendicularly to the pivoting axis of the mounting bracket, this segment lying with its fulcrum on the pivoting axis of the mounting bracket. Thus, the blocking member is pivoted together with the mounting bracket whereas the pressure pawl is pivotably supported against the backrest and/or against the vehicle body.

Preferably, these embodiments likewise include a spring engaging at the mounting bracket for the rearward pivoting of the latter. In this connection, it is furthermore preferred to utilize this spring simultaneously also as the blocking spring of the directional ratchet means, the pressure pawl engaging into the directional teeth of the blocking member under the force of this spring. In particular, the spring engaging the mounting bracket can, for this purpose, be designed as a tension spring which also engages the pressure pawl for the simultaneous provision of the blocking spring of the blocking mechanism.

It can also be readily seen that, in the headrest of this invention, the headrest padding can be conventionally mounted to the mounting bracket to be vertically adjustable.

It is therefore an object of the invention to provide an improved vehicular safety headrest.

It is a further object of the invention to provide a vehicular safety headrest which upon vehicular deceleration will move to a forward position to support the occupant's head during backlash.

It is a further object of the invention to provide a vehicular safety headrest which locks into a forward position.

It is another object of the invention to provide a vehicular safety headrest which is releasable from a forward position to retract to a rearward position providing an unobstructed rear view.

It is another object of the invention to provide a vehicular safety headrest lockable in any one of plural positions.

It is another object of the invention to provide a vehicular safety headrest which assumes a forward position due to the effect of an inertial force of vehicular deceleration.

It is yet another object of the invention to provide a headrest for vehicles comprising a mounting means for carrying headrest padding, and being pivotable relative to the vehicle body in the zone of a backrest about a horizontal pivoting axis extending generally at right angles to the longitudinal axis of the vehicle, from a forward position determined by a stop, means for releasably locking the mounting means into at least one rearward position wherein the center of gravity of the headrest mass lies spaced from the pivot axis of the mounting means above said pivot axis, and from which the mounting means can be pivoted into said forward position under an inertial force acting on the headrest above a predetermined minimum deceleration of the vehicle, the means for releasably locking including a spring-loaded detent means having a directional ratchet means including several directional stop means for locking the mounting means in place in its forward pivoting position and in several rearward pivoting positions against rearward pivoting, and a spring means engaging the mounting means for pretensioning the latter rearwardly in the pivot direction.

These and other objects, features and advantages of the present invention will become more apparent from the following description when taken in connection with the accompanying drawings which show, for the purposes of illustration only, two embodiments in accordance with the present invention employing like reference numerals to represent like parts in the several figures, and wherein.

Figure 1:
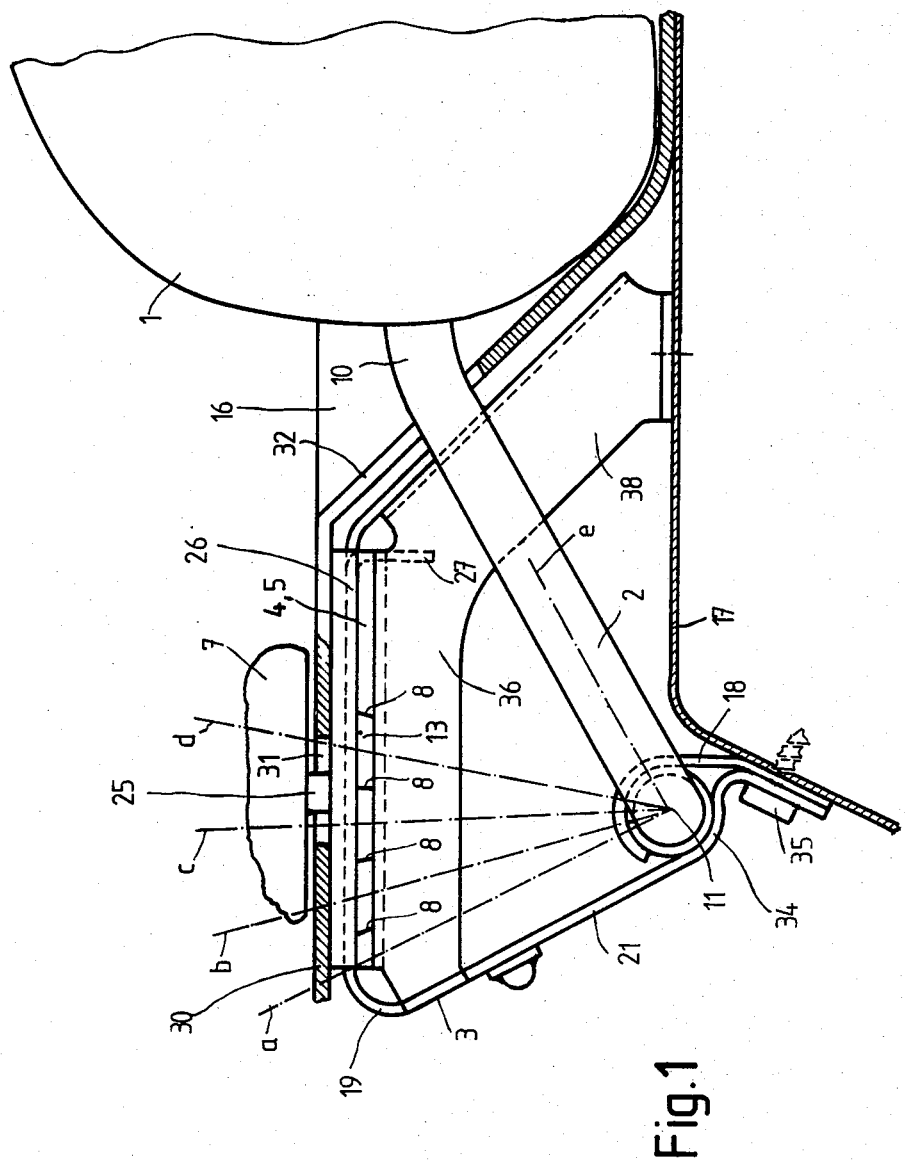
FIG. 1 shows a lateral view of a headrest on a rear vehicle seat of a passenger car, together with its mounting installation.

The embodiment shown in the drawings involves a headrest on a rear vehicle seat of a passenger car. This headrest, for an unoccupied vehicle seat according to FIG. 1, can be folded down with its headrest padding or cushion 1 into an indentation 16 in the hat shelf under the rear window of the vehicle. Thus, the headrest padding is located essentially horizontally and at least partially below the upper edge of the backrest of the rear vehicle seat (not shown) behind the backrest.

The headrest padding 1 is attached, without possibility of adjustment or preferably at least longitudinally adjustable, to the two bracket legs 10 of a U-shaped mounting bracket 2. The latter is pivotably mounted with its bracket base 11 extending horizontally and perpendicularly to the longitudinal axis of the vehicle in the zone of the front edge of a car body panel 17 constituting the hat shelf, with the aid of a bent fishplate 18 threadedly attached thereto and with the aid of the front legs 21 of a mounting base 19. Thus, the mounting bracket can be pivoted about the axis of the bracket base 11. Thereby, the headrest padding 2 can be pivoted, and releasably locked, into one of several upright positions in accordance with the pivoting positions a through d of the mounting bracket 2 shown in dot-dash lines in FIG. 1, from the position illustrated in FIG. 1 wherein the padding is rearwardly swung away and the mounting bracket assumes the pivoting position e shown in dot-dash lines in FIG. 1.

For this purpose, a detent device cooperating with the bracket legs 10 of the mounting bracket 2 of the headrest padding 1 is arranged at a spacing above the bracket base 11 at the mounting base 19 composed of sheet-metal parts and threaded to the body panel 17. The mounting base is arranged between the bracket legs 10 of the mounting bracket and carries a stop 3 integrally formed therewith, this stop determining the foremost pivoting position a of the mounting bracket 2 and thus of the headrest padding 1. In the foremost pivoting position a of the mounting bracket 2, the latter lies with the front side of its bracket legs 10 in contact with the stops 3 formed in the shape of angled fishplates on both sides of the mounting base 19, at a spacing from the pivoting axis of the bracket formed by the bracket base 11. The mounting bracket 2 is held in locking engagement with the stops by means of the locking mechanism engaging the rear side of the bracket legs 10.

The locking mechanism consists of two angle levers 4, 5 (FIG. 2) arranged in a common horizontal plane at a spacing above the bracket base 11. These angle levers are articulated in the zone of the angle apex about vertical pivoting axes 12, constituted by rivets, to the mounting base 19, and are arranged in opposing mirror-image relationship to each other. One of their lever arms 13, pointing forwardly with its free end, extends with its outer lateral edge 20, in the locked position of the angle levers 4, 5, approximately in parallel to the pivoting plane of the bracket legs 10. This lever arm 13 has, at this outer lateral edge 20, several sawtooth-like detent stops 8 arranged in the longitudinal extension of the edge at mutual spacings. The detent stops 8 cooperate, with their forwardly pointing sawtooth flanks, inclined at a large angle with respect to the pivoting plane of the bracket legs 10, with the rearward side of the bracket legs 10 as stop members, preventing a rearward pivoting of the bracket legs 10. The respectively rearward sawtooth flanks of the detent stops are oriented, in the locking position of the angle levers 4, 5, at a small angle with respect to the pivoting plane of the bracket legs 10. As a result, these sawtooth flanks, in the pivoting positions b through d of the mounting bracket 2, in the manner shown in FIG. 2 for the pivoting position d, are in contact with the inside of the bracket legs 10 supported against the forward sawtooth flank of the respective detent stop 8, in a position somewhat offset with respect to the inner apex of the circular cross section of the bracket legs 10, and thus retain these bracket legs 10 to a slight extent also from the front in the locked position.

Figure 2:
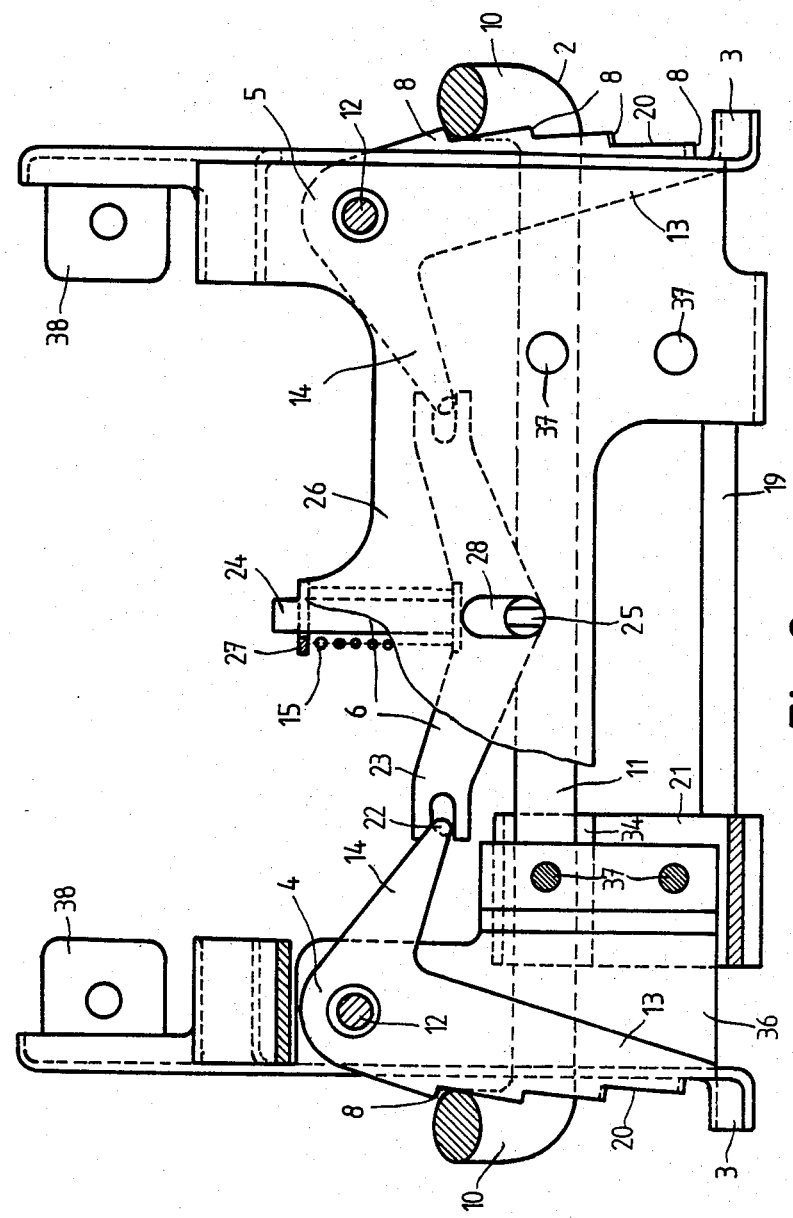
FIG. 2 shows a top view of the mounting installation of the headrest as shown in FIG. 1.
Figure 3:
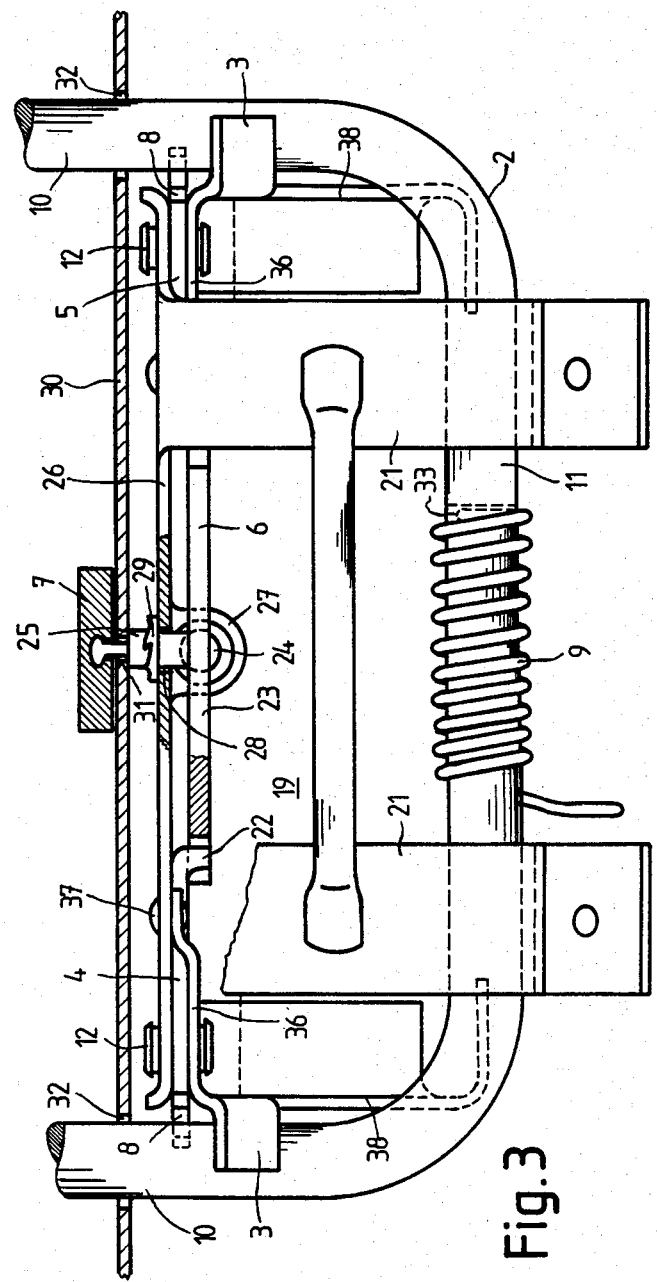
FIG. 3 shows the frontal end view of the mounting installation of the headrest shown in FIGS. 1 and 2.

The other lever arm 14 of the angle levers 4, 5 extends, in the locking position shown in FIG. 2, at right angles to the pivoting plane of the bracket legs 10 and engages, with an engaging fishplate 22, angled downwardly at its free end, into the bifurcated end of an operating strip 23 common to both angle levers 4, 5; this operating strip constitutes part of an actuating slide 6 for releasing the detent device with a bearing pin 24 projecting horizontally from the operating strip toward the rear in parallel to the pivoting plane of the bracket legs 10, a guide pin 25 projecting vertically upwardly from this operating strip, and an operating key 7, FIG. 3, seated on this guide pin. The bearing pin 24 is held displaceably in a bearing fishplate 27 bent at a downward angle away from the top plate 26 of the mounting base 19 at the rear edge of the latter. A restoring spring 15, FIG. 2, is clamped in place between the bearing fishplate 27 and the operating strip 23, this spring being mounted on the bearing pin 24. This spring counteracts the rearward displacement of the actuating slide 6. The guide pin 25 penetrates a guide slot 28 in the top plate 26 of the mounting base 19, which slot extents in the middle between the pivoting planes of the bracket legs 10 in parallel to these pivoting planes. On the topside of the top plate, the guide pin 25 is displaceably supported by means of an internally serrated gear wheel 29, FIG. 3, seated on the guide pin 25. The operating key 7 is in locking engagement with the free end of the guide pin 25 and rests on the topside of a cover plate 30, from which the indentation 16, FIG. 1, is formed for the headrest padding 1. The cover plate 30, FIG. 3, above the guide slot 28 of the top plate 26 of the mounting base 19, has a second guide slot 31 penetrated by the guide pin 25, as well as two passage slots 32, FIG. 1, extending in parallel to the pivoting planes of the bracket legs 10 over the maximum pivoting route of these legs, the bracket legs 10 extending through these passage slots.

A helical spring 9, FIG. 3, is arranged on the bracket base 11 and extends with its one end into a hole 33 of the bracket base 11, while it contacts the body panel 17, FIG. 1, with its other end, bent toward the outside, the mounting base 19 being threaded to this body panel. The spring 9, in this position, is pretensioned so that it acts as a torsion spring and engages the mounting bracket 2 for its rearward pivoting.

The front feet 21 of the mounting base 19 are bent at a downward angle from its top plate 26 and form, in the zone of their free ends at which they are threaded to the body panel 17, bottom bearing bushings 34, FIG. 2, for the bracket base 11. The upper bearing bushings of the pivot bearing of the bracket 2 are formed by curved fishplates 18, FIG. 1, extending from behind over the bracket base 11. These fishplates 18 are preferably joined to the body panel 17 by spot welding and are moreover fixedly mounted to this panel by means of screws 35, with which the front feet 21 of the mounting base 19 are threaded to the body panel 17.

The angle levers 4, 5 are pivotably guided in a guide pocket formed between the top plate 26, FIG. 3, of the mounting base 19 and a bottom plate 36 thereof, this bottom plate 36 being riveted by means of rivets 37, FIGS. 2 and 3, to the top plate 26. At its front edge, the bottom plate 36 forms the angled stops 3 for the foremost pivoting position a of the bracket legs 10, and the rear feet 38 of the mounting base 19 are bent at an angle off the rear edge of this bottom plate 36. The rear feet 38 rest on the horizontal topside of the body panel 17, FIG. 1, and are, in turn, attached by screws to the latter.

Thus, the headrest can be moved from the rearmost pivoting position e of its pivoting bracket, wherein the headrest padding 1 is hidden in the trough 16, up into the foremost pivoting position a of its mounting bracket 2, determined by the stops 3 at the mounting base 19, against the force of the spring 9. During this step, the bracket legs 10 abut against the rear sawtooth flanks of the detent stops 8 of the angle levers 4 and 5 so that the latter, with their lever arms 14, displace the actuating lever 6 against the force of the restoring spring 15 in the rearward direction and, under the force of the restoring spring 15, automatically lock in place, upon each passage of the bracket legs 10, with one of the detent stops 8 of the angle levers 4, 5, behind the bracket legs 10. If the mounting bracket 2 is in its foremost pivoting position a or in one of its rearward pivoting positions b–d, and the actuating slide 9 is shifted rearwardly by means of the operating key 7, so that the angle levers 4 and 5 release with their respective detent stop 8 the mounting bracket 2, then the latter automatically pivots, under the force of the spring 9, into the rearmost pivoting position e of the mounting bracket 2. The spring 9 simultaneously has the effect that, in this rearmost pivoting position e of the mounting bracket 2, the headrest padding 1 is maintained pressed against the bottom of the indentation 16 without rattling.

In the rearward pivoting positions b–d of the mounting bracket 2, the headrest padding 1 is raised up in each case, the center of gravity of the headrest mass lying at a relatively large vertical spacing above the pivot axis of the headrest constituted by the bracket base 11. The mass of the headrest is chosen so that the force of inertia effective above a predetermined minimum deceleration of the automotive vehicle on the headrest in this mass center of gravity is sufficient for pivoting the headrest forwardly automatically into the foremost position determined by the stops 3, against the force of the restoring spring 15 acting on its mounting bracket via the angle levers 5 and against the force of the spring 9 engaging at the bracket base 11 of its mounting bracket 2. In this foremost position, the headrest is then automatically locked in place under the force of the restoring spring 15, FIG. 2. Thereby, the headrest, in case this is necessary, is ready for performing its safety function in its foremost position, and yet can be adjusted into other positions deviating from the foremost position to enhance the comfort of the occupant sitting on the vehicle seat who wishes to lean his head against the headrest padding in a position most convenient for him during the normal driving conditions of the automotive vehicle.

Figure 4:
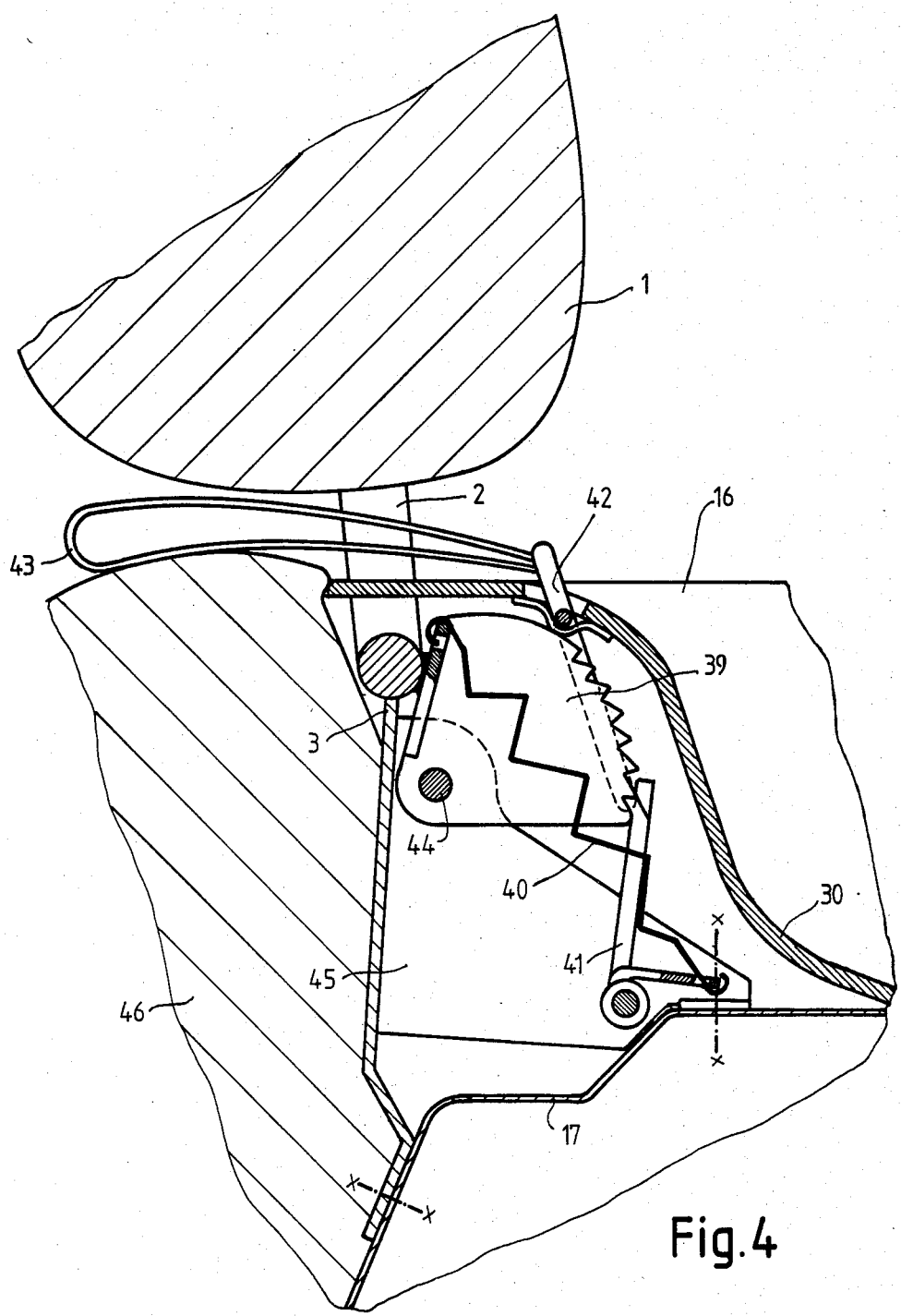
FIG. 4 shows another embodiment of the mounting installation of a headrest on a rear vehicle seat.

Also in the embodiment of FIG. 4, the headrest is attached to a rear vehicle seat. In a modification of the version of FIG. 1, however, the U-shaped mounting bracket 2, to the U-legs of which the headrest padding 1 is attached, is welded to the front edge of two spaced-apart, vertically aligned ratchet wheel segments 39 rotatably supported on a common horizontal axle 44 fixed to the body of the vehicle, this welding connection being located at a spacing above the axle 44. Accordingly, this axle also constitutes the pivot axis of the mounting bracket 2. The axle 44 is supported on the vertical sidewalls of a mounting plate 45 threaded to the body panel 17.

A pressure pawl 41 cooperates with the ratchet wheel segment 39, this pawl 41 being likewise pivotably supported against the sidewalls of the clamping plate 45, but at a spacing from the axle 44 underneath and behind the latter. The pawl 41 is fashioned as an angle lever carrying at its upwardly projecting lever arm, tangentially to the ratchet wheel segment 39, a pawl tooth engaging into the serration of the ratchet wheel segment 39; the rearwardly extending lever arm of this angle lever has a tension spring 40 hung therein, which spring 40, with its other end, is hung into the laterally angled front edge of the ratchet wheel segment 39 at a spacing above the pivot axle 44 of the mounting bracket 2. Thereby the tension spring 40 acts simultaneously as a blocking spring of the directional ratchet means made up of the ratchet wheel segment 39 and the pressure pawl 41 as well as a spring 40 engaging at the mounting bracket 2, by means of which the mounting bracket 2 is pulled, after disengagement of the pressure pawl 41, out of the locking ratchet wheel segment wheel 39 toward the rear into its rearmost pivoting position wherein the headrest padding 1 is swung into the trough 16 behind the upper edge of the backrest 46 of the vehicle seat.

The disengagement of the pressure pawl 41 from the locking wheel segment 39 is effected by means of a two-armed disengagement lever 42 pivotably attached on the underside of the cover plate 30 forming the indentation 16 and covering the mounting device for the headrest. A pull strap 43 is attached to the lever arm of the disengagement lever 42 extending upwardly through a slot in the cover plate 30, whereas the other lever arm of the disengagement lever 42 contacts the front face of the pressure pawl 41 laterally beside the locking tooth of the latter. By pulling the pull strap 43, therefore, the disengagement lever 42 is pivoted so that it swings the pressure pawl 41 rearwardly against the force of the tension spring 40, and the pressure pawl 41, with its locking tooth, comes out of engagement with the directional serration of the ratchet wheel segment 39, whereby, under the force of the tension spring 40, the mounting bracket 2 with the headrest padding 1 is automatically pivoted in the rearward direction.

The clamping plate 45 forms, with the upper rim of its front plate, the stop 3 determining the foremost pivoting position of the mounting bracket 2, the mounting bracket 2 being seated on this stop 3 with its bracket base in the foremost pivoting position.

While I have shown and described only two embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

I claim:

1. A headrest for vehicles comprising:

mounting means for carrying headrest padding, and being pivotable relative to the vehicle body in the zone of a backrest about a substantially horizontal pivoting axis extending generally at right angles to the longitudinal axis of the vehicle, from a forward position determined by a stop, means for releasably locking the mounting means into at least one rearward position wherein the center of gravity of the headrest mass lies spaced from the pivoting axis of the mounting means above said pivoting axis, and from which the mounting means can be pivoted into said forward position under an inertial force acting on the headrest above a predetermined minimum deceleration of the vehicle, the means for releasably locking including a spring-loaded detent means having a directional ratchet means including several directional stop means for locking the mounting means in place in its forward pivoting position and in several rearward pivoting positions against rearward pivoting, and a spring means engaging the mounting means for pretensioning the mounting means toward the rearward position.

2. A headrest according to claim 1, wherein the mounting means comprises legs in U-shaped configuration, the headrest padding being attached to the legs, and the pivoting axis of the mounting means being constituted by a horizontally extending bracket base, the headrest further comprising two angle lever means spaced above said bracket base for pivoting about a vertical pivot axis and disposed in mirror-image relationship in a horizontal plane between the legs, directional stop means along the outer edge of at least a first lever arm of said angle lever means extending approximately in parallel to the vertical pivoting plane of the mounting means for cooperating with said legs, said angle lever means further comprising means for engaging an operating slide means with at least a second lever arm extending at right angles to the pivoting plane of the mounting means, the operating slide means being common to both angle lever means and being rearwardly displaceable against the force of a restoring spring in a direction parallel to the pivoting plane of the mounting means.

3. A headrest according to claim 1, wherein the directional ratchet means further comprises a ratchet wheel segment aligned perpendicularly to the pivoting axis of the mounting means and lying with its fulcrum on said pivoting axis, said ratchet wheel segment being attached to the mounting means, a pressure pawl engaging said ratchet wheel segment under the force of a restoring spring and means for disengaging the pressure pawl from said ratchet wheel segment.

4. A headrest according to claim 3, wherein the spring means for rearwardly pretensioning the mounting means toward the rearward position comprises a tension spring supported against said pressure pawl to form a blocking spring of said directional ratchet means.

* * * * *